(12) United States Patent
Parikh et al.

(10) Patent No.: US 11,487,573 B2
(45) Date of Patent: Nov. 1, 2022

(54) SYSTEMS AND METHOD FOR AUTOMATING SECURITY WORKFLOWS IN A DISTRIBUTED SYSTEM USING ENCRYPTED TASK REQUESTS

(71) Applicant: Thomson Reuters Enterprise Centre GmbH, Zug (CH)

(72) Inventors: Vishal Dilipkumar Parikh, Glen Allen, VA (US); William Stuart Ratner, Glen Allen, VA (US); Akshar Rawal, Swansea, SC (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 197 days.

(21) Appl. No.: 16/405,742

(22) Filed: May 7, 2019

(65) Prior Publication Data
US 2019/0384632 A1    Dec. 19, 2019

Related U.S. Application Data

(60) Provisional application No. 62/668,349, filed on May 8, 2018.

(51) Int. Cl.
*G06F 9/48*     (2006.01)
*G06N 20/00*    (2019.01)
(Continued)

(52) U.S. Cl.
CPC ........ *G06F 9/4806* (2013.01); *G06F 9/44526* (2013.01); *G06F 9/5027* (2013.01);
(Continued)

(58) Field of Classification Search
None
See application file for complete search history.

(56) References Cited

U.S. PATENT DOCUMENTS

| 9,313,208 B1 | 4/2016 | Letz et al. | |
| 2007/0074207 A1* | 3/2007 | Bates | G06F 9/5027 718/1 |

(Continued)

OTHER PUBLICATIONS

International Search Report and Written Opinion issued for PCT Application No. PCT/IB2019/053795, dated Sep. 9, 2019, 8 pages.
(Continued)

*Primary Examiner* — Meng AI T An
*Assistant Examiner* — Zujia Xu
(74) *Attorney, Agent, or Firm* — Norton Rose Fulbright US LLP (57) ABSTRACT

Methods and systems for automating execution of a workflow by integrating security applications of a distributed system into the workflow are provided. In embodiments, a system includes an application server in a first cloud, configured to receive a trigger to execute the workflow. The workflow includes tasks to be executed in a device of a second cloud. The application server sends a request to process the task to a task queue module. The task queue module places the task request in a queue, and a worker hosted in the device of the second cloud retrieves the task request from the queue and processes the task request by invoking a plugin. The plugin interacts with a security application of the device of the second cloud to execute the task, which yields task results. The task results are provided to the application server, via the worker and the task queue module.

14 Claims, 3 Drawing Sheets

(51) Int. Cl.
 *G06F 9/445* (2018.01)
 *G06F 9/50* (2006.01)
 *H04L 9/40* (2022.01)

(52) U.S. Cl.
 CPC ........... *G06N 20/00* (2019.01); *H04L 63/045* (2013.01); *H04L 63/0464* (2013.01); *G06F 2209/503* (2013.01); *G06F 2209/508* (2013.01)

(56) References Cited

U.S. PATENT DOCUMENTS

| | | | | |
|---|---|---|---|---|
| 2008/0270523 | A1* | 10/2008 | Parmar | H04L 67/14 709/203 |
| 2011/0265088 | A1* | 10/2011 | Devadhar | G06F 16/21 718/102 |
| 2013/0124193 | A1 | 5/2013 | Holmberg | |
| 2014/0237457 | A1* | 8/2014 | Munshi | G06F 8/41 717/140 |
| 2015/0073892 | A1* | 3/2015 | Brown | G06Q 30/0246 705/14.45 |
| 2015/0105148 | A1* | 4/2015 | Consul | A63F 13/355 463/31 |
| 2018/0012032 | A1 | 1/2018 | Radich et al. | |
| 2018/0027006 | A1 | 1/2018 | Zimmermann et al. | |
| 2018/0152454 | A1* | 5/2018 | Kwon | H04L 63/10 |
| 2018/0284993 | A1* | 10/2018 | Guim Bernat | G06F 3/0661 |
| 2019/0155660 | A1* | 5/2019 | McQuighan | G06F 9/5022 |

OTHER PUBLICATIONS

European Patent Office, Communication, Extended European Search Report issued for European Patent Application No. 19800101.8, dated Nov. 23, 2021, 7 pages.

* cited by examiner

SYSTEMS AND METHOD FOR AUTOMATING SECURITY WORKFLOWS IN A DISTRIBUTED SYSTEM USING ENCRYPTED TASK REQUESTS

CROSS-REFERENCE TO RELATED APPLICATION

The present application claims priority to U.S. Provisional Application No. 62/668,349, filed May 8, 2018 and entitled, "SECURITY AUTOMATION PLATFORM," the disclosure of which is incorporated by reference herein in its entirety.

TECHNICAL FIELD

The present subject matter is directed generally to automating workflows, and more particularly to automation of security workflows by integrating machine-based security applications of a distributed system into the automated security workflow.

BACKGROUND

Information security (IS) is an essential item in today's wholly computerized world. Enterprises must be able to respond to cybersecurity threats in order to protect their data and resources. However, enterprises are struggling to keep up with the current cybersecurity threat landscape. In particular, current IS systems are plagued with a massive shortage of security professionals, resulting in a lack of resourcing and skills needed to respond to IS incidents. In addition, there are an incredibly large number of security products available, which coupled to the large number of IS incidents that occur, create a suffocating volume of tasks that must be performed in order to detect and remediate these IS incidents. One factor contributing to the situation is that a lot of current IS processes are manual. For example, when responding to an incident, an analyst manually executes a process which may include processing and analyzing data using any number of IS tools.

Moreover, modern security infrastructures are generally distributed across multiple platforms, which may be geographically dispersed, and may include a large number of resources that need to be protected. For example, modern infrastructures may include multiple clouds, internal private clouds, data centers, and/or any combination thereof.

Some solutions have been proposed to address the increasing number of cyber-attacks and the lack of trained personnel. These solutions provide customizable platforms for creating automated workflows. However, these solutions are not robust enough to protect modern infrastructures. In particular, these solutions are focused on traditional data centers, and provide tools that are designed to function on single servers. As such, these solutions are unable to load-balance across multiple servers because of the interdependencies of the different modules of the tool, such as the database, the user interface, the business logic processing unit, among others, and may suffer from under-utilization because scaling such a solution may require reconfiguring a box with more capacity, which is by design under-utilized. In addition, scaling these solutions requires large, tedious, and expensive reconfigurations, which limits rapid scalability of these solutions in response to IS incidents.

SUMMARY

The present application relates to systems and methods for providing automation of IS workflows by integrating machine-based security applications of a distributed system into the automated IS workflow. Embodiments of the present disclosure provide functionality for implementing a cloud-ready security automation product that enables analysts to build automated IS workflows. Aspects of the present disclosure leverage the power of all enterprise and security applications an analyst might use, from a single interface. The handling of tasks in a machine-based security application is automated by embodiments disclosed herein, which in existing systems would be performed manually by an individual. Additionally, various IS processes and/or components thereof can be translated to workflows that may be automated and/or executed when needed. Systems implemented in accordance with the present disclosure provide a scalable architecture that may fit any IS need, and that may be deployed in a public cloud, in a private cloud, in a company's datacenter, and/or any combination thereof.

In one particular embodiment, a system for automating execution of a workflow is disclosed. The system includes an application server hosted in a first cloud. The application server may be configured to receive a trigger to execute the workflow. The workflow may include at least one task to be executed in a device hosted in a second cloud. The application server may also be configured to send a task request to process the at least one task to a task queue (herein also referred to as a task queue module). The system includes the task queue configured to place the task request in at least one request queue of the task queue, and at least one worker hosted in the device hosted in the second cloud. The at least one worker may be configured to retrieve the task request from the at least one request queue of the task queue, and to process the task request. The system may further include at least one plugin, and the processing of the task request may include invoking a plugin, of the at least one plugin, to execute the at least one task. The at least one plugin may be configured to interact with a security application, e.g., an external application, or a security application to which the device hosted in the second cloud has access, to execute the at least one task. Executing the at least one task may yield task results. The at least one worker may be further configured to receive the task results and to push the task results into a result queue of the task queue, and the task queue may be further configured to send the task results from the result queue to the application server.

In another embodiment, a method of automating execution of a workflow is disclosed. The method includes receiving, by an application server hosted in a first cloud, a trigger to execute the workflow, the workflow including at least one task to be executed in a device hosted in a second cloud. The method also includes sending a task request to process the at least one task to a task queue, placing the task request in at least one request queue of the task queue, and retrieving, by at least one worker hosted in the device hosted in the second cloud, the task request from the at least one request queue of the task queue. The method further includes processing the task request. Processing the task request may include the at least one worker invoking a plugin to execute the at least one task. The method further includes interacting, by the plugin, with an external security application or a security application to which the device hosted in the second cloud has access, to execute the at least one task, which may yield task results. The method also includes receiving, by the at least one worker, the task results, pushing the task results into a result queue of the task queue, and sending, by the task queue, the task results from the result queue to the application server.

In yet another embodiment, a computer-based tool for automating execution of a workflow is disclosed. The computer-based tool may include non-transitory computer readable media having stored thereon computer code which, when executed by a processor, causes a computing device to perform operations that may include receiving, by an application server hosted in a first cloud, a trigger to execute the workflow, the workflow including at least one task to be executed in a device hosted in a second cloud. The operations also include sending a task request to process the at least one task to a task queue, placing the task request in at least one request queue of the task queue, and retrieving, by at least one worker hosted in the device hosted in the second cloud, the task request from the at least one request queue of the task queue. The operations further include processing the task request. Processing the task request may include the at least one worker invoking a plugin to execute the at least one task. The operations further include interacting, by the plugin, with an external security application or a security application to which the device hosted in the second cloud has access, to execute the at least one task, which may yield task results. The operations also include receiving, by the at least one worker, the task results, pushing the task results into a result queue of the task queue, and sending, by the task queue, the task results from the result queue to the application server.

The foregoing broadly outlines the various aspects and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Figure 1:
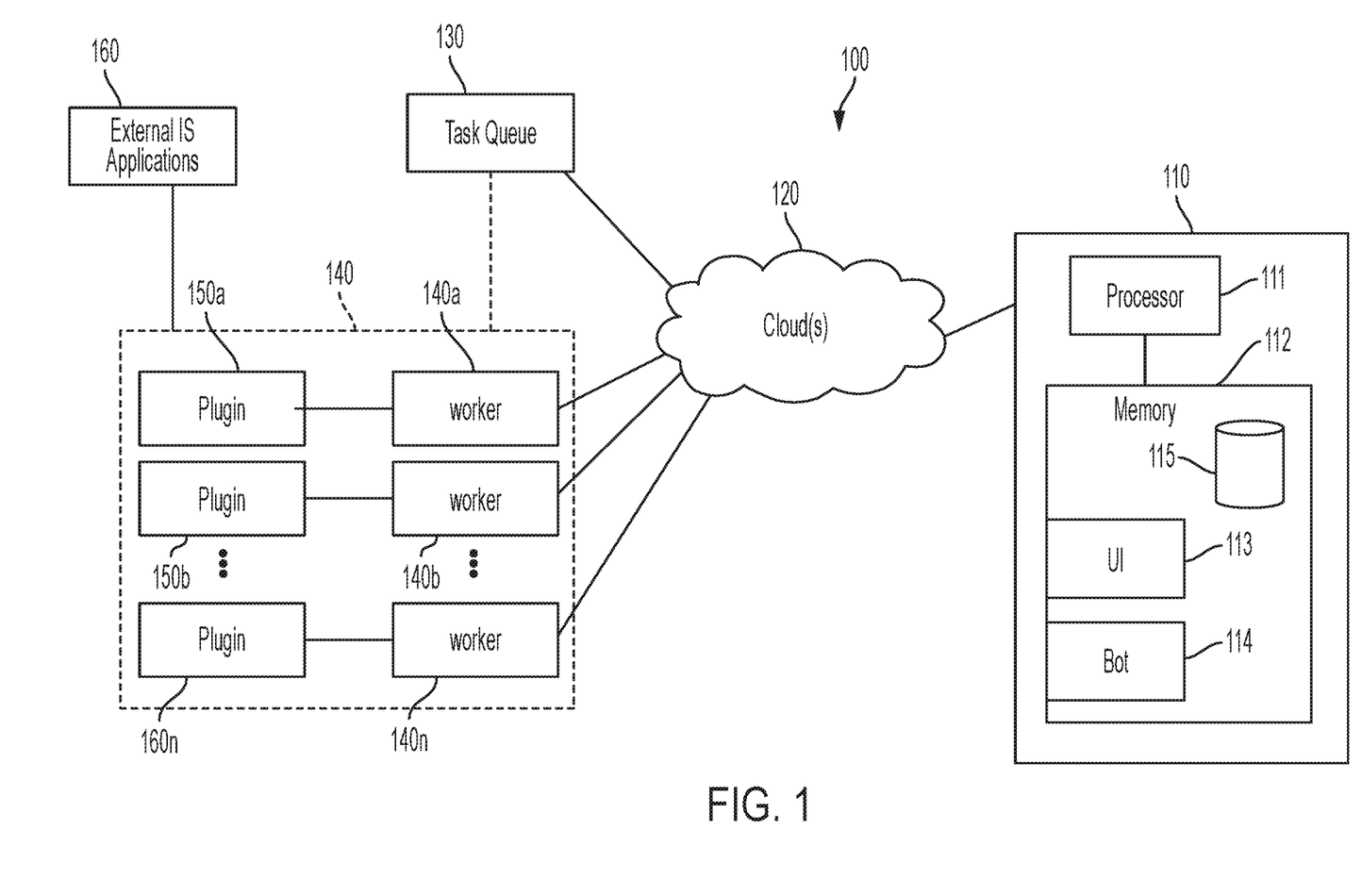
FIG. 1 shows a block diagram of an exemplary system configured to perform operations in accordance with embodiments of the present disclosure.

FIG. 1 is a block diagram of an exemplary system 100 configured in accordance with embodiments of the present disclosure for providing a mechanism to automate information security (IS) workflows by integrating machine-based security applications of a distributed system into the automated IS workflow. In embodiments, system 100 may be configured to provide a mechanism for users to configure and generate the automated IS workflows. The automated IS workflows may be generated by specifying various tasks to be automatically processed by security applications. It is noted that in existing systems, the processing of a task by a security application is done manually by a user executing the security application. In this sense, various aspects of the present disclosure provide functionality for system 100 to generate IS workflows, which may include tasks that may be automated and/or executed based on certain conditions (e.g., when needed, when an event occurs, when manually executed by a user, etc.).

As shown in FIG. 1, system 100 includes application server 110, at least one cloud 120, task queue 130, workers 140*a-n*, and plugins 150*a-n*. These components, and their individual components, may cooperatively operate to provide functionality in accordance with the discussion herein. For example, in operation according to embodiments, an automated IS workflow may be generated to include at least one task. Upon execution of the automated IS workflow, a request to perform a task of the automated IS workflow may be provided by application server 110 to task queue 130 (e.g., in a request queue of task queue 130). A worker of workers 140*a-n*, which may run on a particular platform, may retrieve the task request from task queue 130, and may invoke a plugin of plugins 150*a-n* to execute the task. The invoked plugin may execute the task by performing platform specific tasks. For example, the invoked plugin may interface with an external IS application (e.g., external IS applications 160), which may be an application running on the platform. The results of the task may be provided to the plugin by the external IS application to the invoked plugin, which in turns places the task results into the task queue (e.g., in a response queue of task queue 130). The tasks results may then be transferred to application server 110. In aspects, application server 110 may provide another request to perform another task of the automated IS tasks to task queue 130 for processing, based on the task results.

It is noted that the functional blocks, and components thereof, of system 100 of embodiments of the present invention may be implemented using processors, electronic devices, hardware devices, electronic components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

It is noted that the functionality of system 100 may be provided by the cooperative operation of various components of server 100. In aspects, system 100 and its individual functional blocks may be implemented as a single device or may be distributed over multiple devices having their own processing resources, whose aggregate functionality may be configured to perform operations in accordance with the present disclosure. Furthermore, those of skill in the art would recognize that although FIG. 1 illustrates components of system 100 as single and separate blocks, each of the various components of system 100 may be a single component, may be functional components of a same component, or the functionality may be distributed over multiple devices/components. In such aspects, the functionality of each respective component may be aggregated from the functionality of multiple modules residing in a single, or in multiple devices. As such, system 100 may be orchestrated and/or implemented as a single component, or as separate and disjointed components interacting via a communication protocol. Additionally, the various components of system 100, and/or system 100, may be scaled up when it may be determined that utilization of the component or the system remains above a predetermined threshold for a predetermined duration, and/or may be scaled down when the utilization of the component or the system remains below a predetermined threshold for a predetermined duration. In embodiments, the thresholds for the scaling activity may be defined such as to optimally utilize the provisioned resources. In some implementations, each component operates independent of the other components with respect to the component's functionality and purposes. In these cases, the independence of the various components may be with respect to the communication between components, and not with respect to the environment or systems in which the various components may be deployed. In some aspects, as the various components and/or system 100 are scaled up or down, all relevant delegation of duties may be load-balanced.

Clouds 120 may include a single cloud, over which the various functional components of system 100 may communicate, or in which the various functional components of system 100 may be hosted. Alternatively, clouds 120 may include a plurality of clouds, such as in a multi-cloud environment. In this case, clouds 120 may include one or more clouds, an internal private cloud, a data center, and/or any combination thereof. In embodiments, the functional components of system 100 may be distributed over clouds 120. For example, each of the functional components of system 100 may be hosted in a different cloud, or some of the functional components of system 100 may be hosted in one cloud while others are hosted in a different cloud. In one particular implementation, each of workers 140a-n, or each subset of workers 140a-n, may be hosted in a separate cloud. In particular, any worker of workers 140a-n may be installed in any server/host of any of clouds 120. As such, the functionality of system 100 in accordance with aspects of the present invention is cloud agnostic, and may provide management and control of automated execution of a workflow of tasks across multiple clouds.

Cloud 140, although illustrated as a single component including workers 140a-n for illustrative purposes, may include a plurality of clouds over which workers 140a-n may be distributed. Therefore, the illustration with respect to cloud 140 including workers 140a-n should not be construed as limiting in any way.

As shown in FIG. 1, application server 110 includes processor 111, memory 112, database 115, UI 113, and bot 114. In aspects, application server 110 may be configured to provide functionality to facilitate configuration, generation, and management of automated IS workflows. Application server 110 may be configured to provide a user interface (UI) 113, where users may input specifications, parameters, and other configuration information for creating at least one automated IS workflow. As noted above, automated IS workflows may be created by specifying a number of tasks to be executed or processed in the automated IS workflow, the specified tasks defining the automated IS workflow. In that sense, a workflow as used herein may refer to a combination of logically connected tasks which may perform a series of actions. In aspects, the tasks of the automated IS workflow may be specified to be executed/processed in a particular order or sequence, or may be specified without a particular order or sequence. As used herein, a task may refer to a task or process to be executed by a machined-based security application residing in a platform/host, and which may yield some results. Tasks may be platform/host specific, or may be able to run on any platform/host, of any cloud of clouds 120. At a workflow level, the location where a task is to be executed may be specified, or the task may be executed wherever there are available resources. The machine-based security application, as discussed in-more depth below, may be one or more security products or resources available in the platform in which the task is to be executed, and which may return, upon its execution, some IS related results/data. It will be appreciated that, in existing systems, tasks may be performed manually by a user in response to IS incidents. In aspects, application server 110 may be configured to, upon execution of an automated IS workflow, push requests to perform tasks of the automated IS workflow, in accordance with the automated IS workflow structure, to task queue 130. As will be discussed below in more detail, the task requests pushed to task queue 130 may be encrypted by application server 110 before being pushed to task queue 130.

In aspects, application server 110 may provide role-based access controls for automated IS workflows, plugins, and secrets (e.g., key encryption and other security related data) management. In these aspects, a user may only be given access (e.g., via UI 113) to manage automated IS workflows, plugins, and secrets if the role of the particular user meets a particular criteria. In some cases, a user in one role may have higher access, or may be able to perform more management actions, than a user in a different role. Application server 110 may also be configured to manage communications between task queue 130 and database 115. As will be discussed in more detail below, task information (e.g., task results, information on which task queue the task was pushed to, information on which worker processed the task, etc.) may be stored in database 115 as historical data. In addition, cache information, such as location of task queues, information indicating which task queue each worker may be monitoring, etc. may also be stored in database 115. In these cases, communications between task queue 130 and database 115 may be managed by application server 110.

Application server 110 may also be configured to initiate execution of automated IS workflows. For example, after an automated IS workflow is created, execution of the automated IS workflow may be triggered by the occurrence of any one of a number of events. In aspects, UI 113 may receive an input from a user indicating that execution of the automated IS workflow is desired. In this case, application server 110 may initiate execution of the automated IS workflow based on the user input. In additional, or alternative aspects, execution of the automated IS workflow may be triggered by bot 114. For example, as will be discussed in more detail below, a user may interact with bot 114. Based on the interaction, bot 114 may determine to execute a particular automated IS workflow (or more than one automated IS workflow), and may cause application server 110 to perform the execution. In aspects, application server 110 may initiate execution of the automated IS workflow based on an input received from an external source. For example, application server 110 may be integrated with external applications and, upon the occurrence of an event, the external application may signal application server 110 to trigger an automated IS workflow.

Application server 110 may also provide functionality for plugin and worker management. For example, UI 113 may be configured to allow users to specify configuration information for plugins 150a-n and workers 140a-n, such as security applications associated with the plugins, and association of the plugins to workers. In addition, for workers, users may specify task queues (e.g., of tasks queue 130) to be monitored by each of the workers.

It is noted that, although the discussion herein focuses on operations with respect to an automated IS workflow, the functionality disclosed in the discussion similarly applies to operations with more than one automated IS workflow. In these cases, application server 110 may trigger any one of the more than one automated IS workflows, or may trigger more than one automated IS workflow. Thus, the discussion below with respect one automated IS workflow should not be construed as limiting in any way.

Application server 110 may include bot 114 configured to provide user-interaction that may be used to access and/or leverage the functionality of application server 110. Bot 114 may allow a user to retrieve and/or manage automated IS workflows. In particular, users may interact with bot 114 and may be able to trigger workflows. For example, users may ask for information on an IS entity, which may trigger an automated IS workflow that includes tasks that provide the requested information. In this manner, automation may be triggered by bot 114.

One of the major advantages of automation is that it allows for a speedy execution of a preset task, but workflows are limited in their effectiveness by the knowledge and skills of those who create them. Bot 114 may provide functionality to leverage historical data stored in database 115. This historical data may include information on previous events that occurred, previous tasks executed, previous workflows executed, and systems/components impacted by the events, tasks, and workflows. Bot 114 may be configured to correlate IS events with this historical data in order to update the relational database 115. In aspects, bot 114 may run continuously and every time a new IS event occurs, or an automated IS workflow is triggered, bot 114 may reference database 115 to identify similarities to past correlations. Bot 114 may also employ a neural network approach and or machine-based learning to bolster or weaken correlations that may be repeated. Additionally, or alternatively, bot 114 may be configured to predict, based on an event, potential future events with a reasonable level of confidence. As application server 110 maintains database 115 in an updated state, when an IS event occurs, bot 114 may use the historical data and correlations to predict possible future events with a reasonable level of confidence.

As will be appreciated, the functionality of bot 114, and of database 115, provides the advantage of predicting potential IS events/incidents with a reasonable level of confidence, in which case the appropriate personnel may be alerted to potential activity so that mitigating or prevention measures may be put in place. Additionally, when new commonly known vulnerabilities are released, the data in database 115 may potentially be used to identify which systems may be affected by those vulnerabilities. Also, data about similarities between systems may be used to initiate remediation efforts if a certain IS event affecting a given system occurs. With increasing confidence in the predictions, IS teams may be able to take pro-active actions instead of attempting to keep up with attacks after they have occurred.

The functionality of application server 110 may be provided by the cooperative operation of various components of application server 110. Although FIG. 1 shows a single application server 110, it will be appreciated that application server 110 and its individual functional blocks may be implemented as a single device or may be distributed over multiple devices having their own processing resources, whose aggregate functionality may be configured to perform operations in accordance with the present disclosure. Furthermore, those of skill in the art would recognize that although FIG. 1 illustrates components of application server 110 as single and separate blocks, each of the various components of application server 110 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

Processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, as noted above, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

Memory 112 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 112 may comprise a processor readable medium configured to store one or more instruction sets (e.g., software, firmware, etc.) which, when executed by a processor (e.g., one or more processors of processor 111), perform tasks and functions as described herein.

Memory 112 may also be configured to facilitate storage operations. For example, memory 112 may comprise database 115 for storing user profile information (e.g., privilege levels, preference data, statistical data, login credentials, etc.), historical data, cached data, etc., which system 100 may use to provide the features discussed herein. Database 115 is illustrated as integrated into memory 112, but may be provided as a separate storage module. Additionally or alternatively, database 115 may be a single database, or may be a distributed database implemented over a plurality of database modules.

Task queue 130 may be configured to facilitate dispatching of task requests to appropriate workers. In aspects, task queue 130 may include one or more queues. The queues in task queue 130 may be read/write queues into which task requests may be added, and from which task requests may be retrieved. For example, upon execution of an automated IS workflow, requests to perform tasks of the automated IS workflow may be pushed (e.g., written) from application server 110 to a queue of task queue 130. Additionally, task requests in the queues of tasks queue 130 may be retrieved (e.g., read) by an appropriate worker. Task queue 130 may be configured to be reliable and highly available.

The queues in task queue 130 may be specified in configuration information. In aspects, the configuration information may be predefined, or may be provided by a user using UI 113. The queues in task queue 130 may be specific to a particular environment, a specific type of tasks, a specific task, etc. Configuration of the tasks or task requests (e.g., in the automated IS workflow configuration) may specify into which queue of task queue 130 a particular task requests is to be added after being pushed by application server 110. In that sense, an automated IS workflow may specify into which queue the task requests may be added (e.g., all task requests may be added to the same queue, a subset of task requests may be added to one queue while another subset of task requests may be added to another queue, etc.). In some cases, a general purpose queue may be provided in task queue 130. Task requests that do not specify into which queue these task requests are to be added may be added to the general purpose queue.

In aspects, the task requests may be held in the queues until the task requests may be dispatched to a worker (e.g., a worker of workers 140*a-n*). In this sense, task queue 130 provides an asynchronous mechanism for processing/executing the tasks, which decouples application server 110 and workers 140*a-n* by separating the sending and receiving of data via the asynchronous mechanism. Workers 140*a-n* may monitor queues of task queue 130 and may retrieve task requests from the queues. In some cases, task queue 130 may actively search and determine (e.g., by polling workers 140*a-n*) which worker, or workers, may be able to process a particular task request, and may dispatch the particular task request to the determined worker(s). In aspects, task requests in the queue of task queue 130 may be encrypted while at rest (before dispatching) and may also be encrypted before being dispatched to workers.

Task queue 130 may also include at least one task results queue, which may be configured to receive task results from workers 140*a-n*, as described below. In aspects, a task results queue may be provided for each corresponding request queue in task queue 130, or a single request queue may be provided for all queues. In aspects, the request queue may also function as a results queue.

Workers 140*a-n* may be configured to facilitate processing/execution of the tasks of the automated IS workflow. In aspects, workers may be hosted, or may run, on one or more servers, platforms, or hosts. The one or more servers, platforms, or hosts may be associated with a cloud, or with more than one cloud, such as cloud 120. Although workers 140*a-n* are illustrated as included in cloud 140, it is noted that in embodiments, workers 140*a-n* may be distributed over multiple clouds, over multiple servers, or over multiple servers over multiple clouds. In this sense, workers may be deployed to various resources of an enterprise system without being limited by the distributed infrastructure of modern systems.

Workers 140*a-n* may retrieve, or receive, messages from task queue 130. The messages may include task requests to execute tasks of the automated IS workflow. In aspects, workers 140*a-n* may be configured to monitor task queue 130. As noted above, task queue 130 may include a plurality of queues, and workers may selectively monitor various queues of the plurality of queues. For example, worker 140*a* may monitor a general purpose queue of task queue 130, while worker 140*b* may monitor an environment-based queue of task queue 130. When task requests are available at these queues, worker 140*a* and 140*b* may respectively retrieve the task requests for execution/processing. The worker may retrieve task requests from queues that the worker monitors based on the available resources of the worker, or based on the type of task requested in the queue. For example, worker 140*a* may determine that it has insufficient resources available to handle a task, or may determine that a task in a task request available in the general purpose queue is of a type incompatible with worker 140*a*, or incompatible with any of the plugins associated with worker 140*a*. In this case, worker 140*a* may not retrieve the task request from the general purpose queue. Conversely, worker 140*a* may determine that it has sufficient resources available to handle a task, or may determine that a task in a task request available in the general purpose queue is of a type compatible with worker 140*a*, or compatible with at least one plugin associated with worker 140*a*. In this case, worker 140*a* may retrieve the task request from the general purpose queue for processing. In aspects, a worker retrieving a task request may decrypt the incoming task request, as will be discussed in more detail below.

In some embodiments, multiple workers may monitor the same queue (e.g., workers 140*a* and 140*b* may both monitor the general purpose queue of task queue 130), and a particular worker may monitor multiple queues (e.g., worker 140*b* may monitor both the general purpose queue and the environment-based queue of tasks queue 130). In some cases, the workers may be load-balanced across the various queues of task queue 130 so that a particular queue may be monitored by more workers than other queues. For example, the general purpose queue may be monitored by a larger number of workers than the number of workers monitoring the environment-base queue. This load-balancing of workers may be in response to a larger, or significant number of task requests being placed on particular queues. For example, the general purpose queue may have more task requests placed on it, and as such, system performance may be improved by having more workers monitoring the general purpose queue than the workers monitoring the other available queues which may have a lesser number of task requests placed on them. In aspects, the load-balancing may be done base on a threshold number of task requests being placed on a particular queue. For example, load-balancing may be performed when the task requests in the general purpose queue exceed a predetermined number of task requests. In some embodiments, collected metrics and statistics may be used to determine which queue the various workers of workers 140*a-n* may monitor. In yet other aspects, load balancing may include dispatching the same task request to multiple workers. In this case, the multiple workers may process the task request in parallel. The number of multiple workers that may process the task request in parallel may be scaled or down depending on the task request load at the various queues.

In some aspects, worker 140a-n may periodically ping application server 110. In this manner, application server 110 may identify when workers have failed, or are unable to process task requests. In the particular case when all available workers have failed, application server 110 may pause execution of the automated IS workflow execution until one or more failed workers are back up, or until a predetermined period of time, in which case a failure may be declared.

A worker retrieving a task request may be responsible for processing the task request. In aspects, processing the task request may include invoking a plugin for execution of the task in the task request. In some cases, the plugin may be associated with the worker, in which case the plugin to be invoked by the worker may be pre-identified, or the plugin to be invoked may be identified by the worker based on the task to be executed. For example, worker 140a may retrieve a particular task request from task queue 130. The retrieved task request may be a request to perform a particular task. Worker 140a may be associated with plugin 150a, in which case worker 140a invokes plugin 150a and provides the task request to plugin 150a for execution of the particular task. Alternatively, worker 140a may determine a plugin that matches the particular task in the task request. For example, whether worker 140a is associated with any of plugins 150a-n, worker 140a may make a determination as to which of plugins 150a-n matches the particular task to be executed, and provides the task request to the identified plugin. In aspects, matching a plugin to the particular task may include determining that the plugin functionality is able to execute the task and provide relevant task results.

In embodiments, a worker responsible for processing a task request, having identified a matching plugin, may determine (e.g., via a service discovery call) whether the plugin to be invoked is running, and/or where the plugin is running. Upon receiving notification that the plugin is running, and/or where the plugin is running, the worker may send the task request to the plugin for execution. On the other hand, upon receiving notification that the plugin is not running, the worker may download the plugin to the appropriate location, and may then run the plugin. When the plugin is running, the worker may send the task request to the plugin for execution. Thus, the process described herein ensures that the matching plugin is downloaded and running. In embodiments, the matched plugin may be cached, such that another worker subsequently identifying the matched plugin as a plugin to be invoked for a subsequent task may re-use the plugin, without having to download and re-run. As will be appreciated, re-using the plugins may improve performance by making the execution of the automated IS workflow faster.

Workers 140a-n may be configured to receive task results from plugins executing the tasks. For example, after execution of a task by an invoked plugin, the tasks results may be provided by the plugin to the worker that invoked the plugin. In other aspects, the task results from a plugin may be provided to a worker other than the worker that invoked the plugin. In yet other aspects, a task results worker may be provided to receive task results from plugins, regardless of which worker invoked the plugin.

Plugins 150a-n may be configured to execute the tasks of the automated IS workflow. Plugins 150a-n may be configured as services running on particular resources (e.g., servers, platforms, hosts, etc.) where the tasks are to be executed. In aspects, plugins 150a-n may be containerized components that interact with workers 140a-n to receive tasks requests. Plugins 150a-n may communicate with workers 140a-n via communication protocol (e.g., java script object notation/remote procedure call (JSON/RPC)). As noted above, each plugin of plugins 150a-n may be associated with a worker of workers 140a-n. Alternatively, more than one plugin may be associated with a single worker, or one plugin may be associated with multiple workers, or there may be no association between the plugins and the workers.

Plugins 150a-n may be configured to interact with security applications (e.g., external IS applications 160) to execute the tasks of the automated IS workflow. For example, plugin 150a, having been invoked by a worker, may be responsible for executing a particular task of the automated IS workflow. Plugin 150a may interact with at least one IS application of external IS applications 160 in order to execute the task, such as by communicating with the external IS application's application programming interface (API). In some aspects, plugin 150a may interact with one or more of the external IS applications 160. External IS applications 160 may include one or more security applications, resources, or products available in a cloud, or in an enterprise. As noted above, external IS applications 160 may be configured to at least partially interact with plugins 150a-n to execute the tasks of the automated IS workflow.

Plugins 150a-n may be configured as small containerized services that may be configured to leverage a software development kit (SDK) to interface with system 100, while also interfacing with external IS applications 160. In that sense, plugins 150a-n provide a mechanism to execute a task that leverages the various security tools of an enterprise, while providing a standardized interface into the automated system provided in the embodiments described here. Plugins 150a-n may be written in any programming language, and may employ the SDK provided by a system in accordance with embodiments of the present disclosure to interface with the system.

As noted above, in aspects, task requests and task results may be encrypted at rest and in transit. Various aspects provide for such encryption functionality via hop encryption. As noted above, embodiments of the present disclosure are configured to be scalable. As such, data required to execute a particular task may be passed through the process along with the task request. In this manner, the task request may be processed by any worker, and executed by any plugin. In order to address potential security issues related to passing sensitive information between nodes, systems implemented in accordance with the present disclosure may employ hop encryption as disclosed herein.

Figure 2:
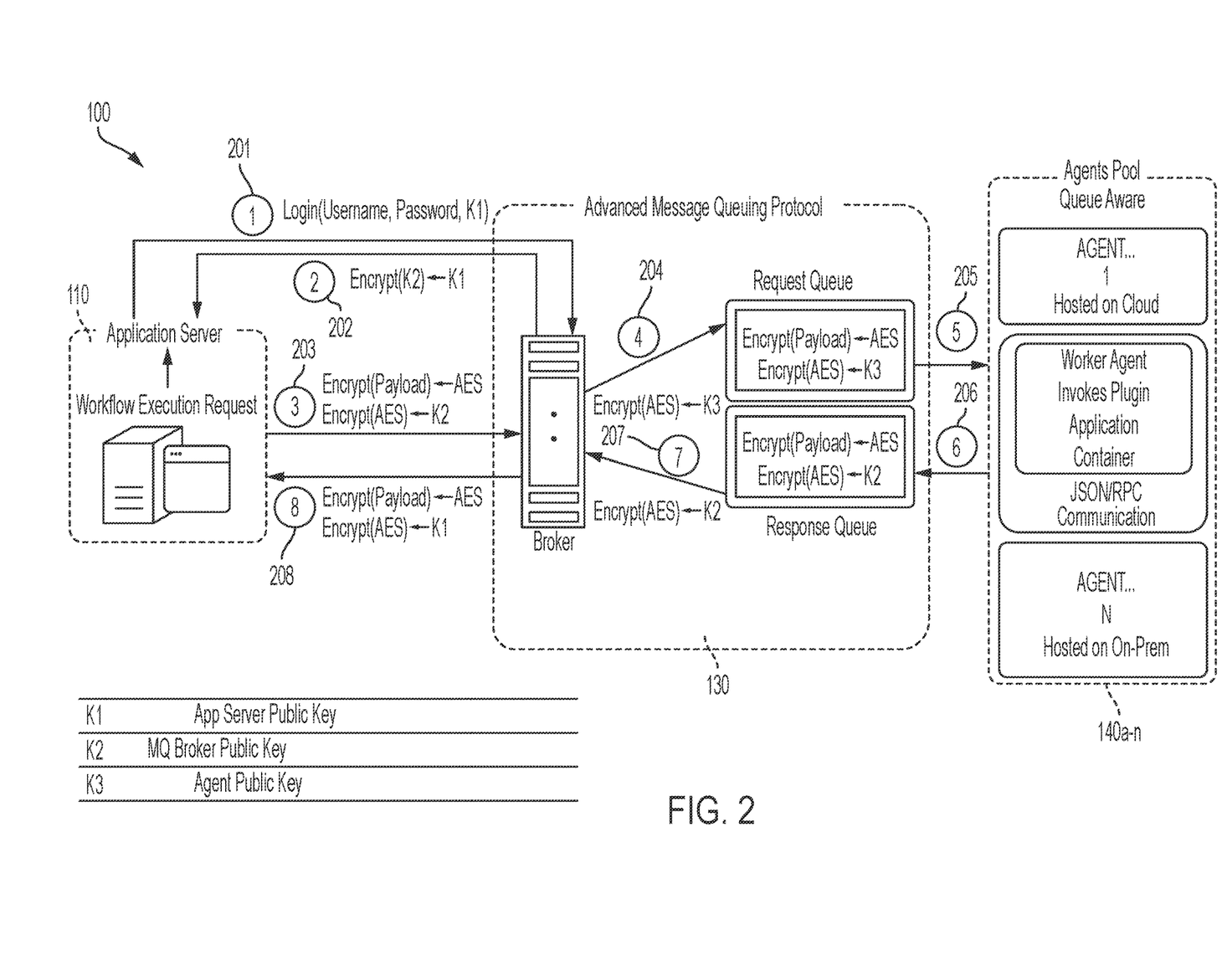
FIG. 2 shows a diagram illustrating an example of a hop encryption implementation.

FIG. 2 shows a diagram illustrating an example of a hop encryption implementation. While HTTPS may be used to encrypt data in transit, hop encryption in accordance with aspects of the present disclosure allows a large distributed infrastructure, with a wide attack surface for data to be potentially compromised, to mitigate the risk by providing for a secure transmission of data between various components of the system. For example, in aspects, a hybrid encryption technique, using both symmetric encryption algorithms (e.g., advanced encryption standard (AES)) and asymmetric encryption algorithms (e.g., public/private key encryption) may be used. At 201, a user may login to application server 110 (e.g., via UI 113). The user may provide a username and password. Also at 201, a public key for application server 110 may be provided to task queue 130. At 202, task queue 130 may encrypt public key for task queue 130 using application server 110's public key. The encrypted task queue 130's public key may then be provided to application server 110. Application server 110 may decrypt the encrypted task queue 130's public key using application server 110's private key.

At 203, application server 110 may encrypt a payload using an AES key. The payload may include a request to execute a task of an automated IS workflow to be added to a queue of task queue 130. Application server 110 may then encrypt the AES key using the decrypted task queue 130's public key. As such, in this example, the payload is encrypted using AES encryption, whereas the AES key is encrypted using public/private key encryption. The encrypted payload and the encrypted AES key may be transmitted to task queue 130. Task queue 130 may then decrypt the encrypted AES key using its own private key. In some optional embodiments, task queue 130 may use the decrypted AES key to decrypt the payload that may include the task request.

At 204, task queue 130 may determine to place the task request in a particular queue, or particular queues. In addition, it may be determined that task request is to be processed by a particular worker, e.g., worker 140*a*. In this case, prior to dispatching the payload, which may include the task request, to worker 140*a*, task queue 130 may encrypt the AES key using worker 140*a*'s public key. In optional aspects, task queue 130 may also encrypt the payload (when the payload may have been decrypted by task queue 130) using the AES key. At 205, the encrypted payload and the encrypted AES key may be transmitted to worker 140*a*. Worker 140*a* may then decrypt the encrypted AES key using its own private key, and then may use the decrypted AES key to decrypt the payload that may include the task request. Worker 140*a* may use the decrypted payload to process the task request as described above. Task results may be obtained by worker 140*a*. It is noted that in some aspects, the payload is not decrypted by any nodes prior to arriving at the worker. Thus, in these embodiments, only the worker decrypts the payload. In this case, even if a particular worker may be compromised, without the private key of the worker for which the task was intended, the malicious worker may not be able to decrypt the actual payload.

At 206, prior to pushing the task results to the response queue of task queue 130, worker 140*a* may encrypt a payload, which may include the task results, using the AES key, and then may encrypt the AES key using task queue 130's public key. The encrypted payload and the encrypted AES key may be transmitted to task queue 130 and placed on the response queue. At 207, task queue 130 may then decrypt the encrypted AES key using its own private key, and may then re-encrypt the AES key using application server 110's public key. In optional embodiments, task queue 130 may also decrypt and re-encrypt the payload using the decrypted AES key. At 208, the encrypted payload and the encrypted AES key may be transmitted to application server 110. Application server 110 may then decrypt the encrypted AES key using its own private key, and then may use the decrypted AES key to decrypt the payload that may include the task results. Again, it is noted that in some aspects, the payload that includes the task results may not be decrypted by any nodes prior to arriving at the application server. Thus, in these embodiments, only the application server decrypts the payload with the task results.

Figure 3:
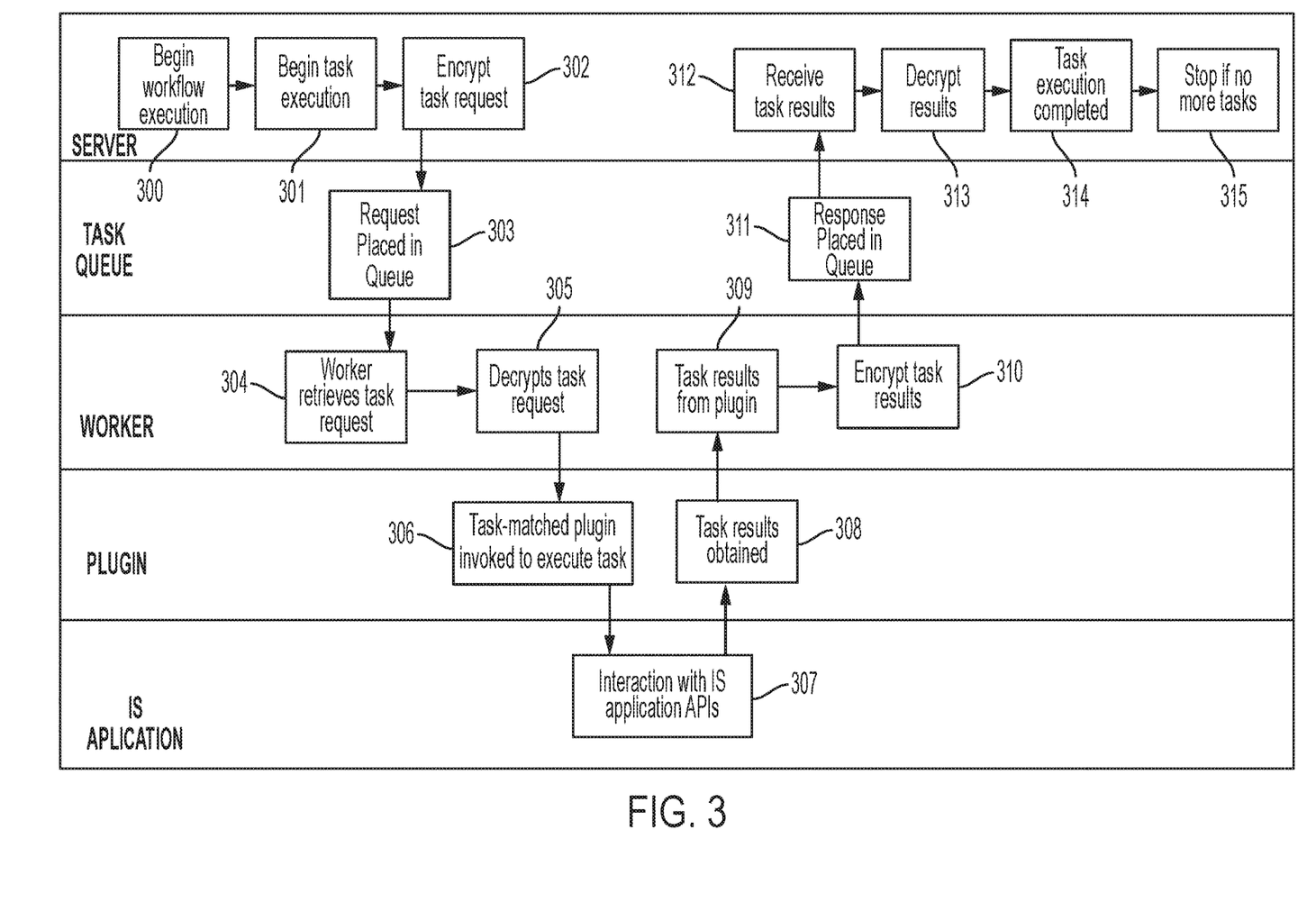
FIG. 3 shows a functional block diagram illustrating an example flow executed to implement aspects of the present disclosure.

FIG. 3 shows a high level flow diagram of operation of a system configured in accordance with aspects of the present disclosure for providing automation of IS workflows by integrating machine-based security applications of a distributed system into the automated IS workflow. In general terms, embodiments of the present disclosure provide functionality for implementing a cloud-ready security automation product that enables analysts to build automated IS workflows. Aspects of the present disclosure leverage the power of all enterprise and security applications an analyst might use, from a single interface. The handling of task in a machine-based security application is automated by embodiments disclosed herein, which in existing system would be done manually by an individual. Additionally, various tasks/applications are managed in order to create workflows that may be automated and/or executed when needed. Systems implemented in accordance with the present disclosure provide a scalable architecture that may fit any IS need, and that may be deployed in a public cloud, in a private cloud, in a company's datacenter, and/or any combination thereof.

One of the advantages of the techniques and systems disclosed herein is that repetitive tasks may be minimized and workflow execution may be faster, which may increase efficiency, quality, and efficacy of the process and may also improve event response times. In addition, the solutions provided herein may be applied in multi-cloud environments, which allow for on-demand, near real-time auto-scaling and load-balancing the execution of workflows across multiple servers, platforms, hosts, clouds, etc. The solutions herein also allow for targeted use of resources, which avoids under-utilization of resources.

The flow diagram illustrated in FIG. 3 lays out particular steps within the functionality of one of a server, task queue, worker, plugin, and IS application. It is noted that this component is similar to the respective components of system 100 of FIG. 1 discussed at length above. As such, the functions illustrated in the example blocks shown in FIG. 3 may be performed by system 100 of FIG. 1 according to embodiments herein.

At block 300, an application server begins execution of an automated IS workflow. In embodiments, automated IS workflow may include at least one task to be executed. The automated IS workflow, including its configuration and the tasks to be executed, may be specified and configured by the application server, such as by a user specifying the configuration, or by a neural net, or machine-based learning, module (e.g., bot 114). In aspects, the tasks of the automated IS workflow may define a sequence of tasks that may be executed to complete the execution of the automated IS workflow. At block 301, the application server begins execution of a task of the automated IS workflow. For example, the application server may begin execution of the initial task in the sequence of tasks of the automated IS workflow, or may be a subsequent task, in cases where the execution of the initial task has already been completed.

At block 302, a payload of a task message, which may include task request, is encrypted by the application server. As discussed above, encryption of the payload may be in accordance with the hop encryption schema described above. Thus, a combination of symmetric and asymmetric encryption may be used to encrypt the task request by application server at block 302. The encrypted task message may include the task request encrypted using an AES key, and the AES key encrypted using the task queue's public key. At block 303, the task request is placed in a queue of the task queue. In aspects, the queue in which the task request is placed may be determined based on the configuration of the automated IS workflow, which may specify into which queue each task of the automated IS workflow is to be placed. In some aspects, the task request may be placed on more than one queue. In embodiments, the task queue may not decrypt the task request and thus, the task request in the queue may be the task request encrypted at the application server. However, the task queue may decrypt the encrypted AES key received from the application server, and may re-encrypt the AES key using the intended worker's public key.

At block 304, at least one worker retrieves the task request from the task queue. In aspects, the worker retrieving the task request may be a worker actively monitoring the queue in which the task request was placed. In some aspects, the worker may also be monitoring additional queues. In addition, additional workers may also be monitoring the queue, and in this case, the task may be retrieved by more than one worker and may be processed in parallel. The worker may running in a platform/host that is different than the platform/host in which the application server and the task queue are running. At block 305, the worker decrypts the task request. The worker may decrypt the task request by first decrypting the AES key using its own private key, and then using the decrypted AES key to decrypt the task message payload that includes the task request. It is noted that, in embodiments, the task request is not decrypted during transit from the application server to the worker.

At block 306, the worker processes the task request by matching the task request to at least one plugin. In aspects, the matched plugin may be a plugin associated with the worker, or may be a plugin identified by the worker based on the task to be executed. In aspects, processing the task request may include invoking the matched plugin for execution of the task in the task request and providing the task request to the invoked plugin. In aspects, the worker may determine (e.g., via a service discovery call) whether the matched plugin is running, and/or where the plugin is running. Upon receiving notification that the plugin is running, and/or where the plugin is running, the worker may send the task request to the plugin for execution. On the other hand, upon receiving notification that the plugin is not running, the worker may download the plugin to the appropriate location, and may then run the plugin. When the plugin is running, the worker may send the task request to the plugin for execution.

At block 307, the plugin executes the task. In embodiments, executing the task may include the plugin interacting and/or communicating with an API of an IS application hosted on or off the platform in which the task is executed (e.g., the platform/host in which the plugin resides). The plugin performs platform/host specific activities leveraging the IS application functionality and resources, and the interaction may yield task results. At block 308, the task results are obtained by the plugin, and at block 309, the task results are obtained by the worker from the plugin. As noted above, the worker interacts with the plugin via communications protocols (e.g., JSON/RPC). At block 310, the worker encrypts the task results. In aspects, the worker may encrypt the task results using the AES key obtained from the application server. The worker may then encrypt the AES key using the task queue's public key. At block 311, the encrypted task results are placed in the response queue of the task queue. In aspects, the response queue may be a separate queue, or may be the same queue as the request queue. The task queue may also receive the encrypted AES key from the worker. In this case, the task queue may decrypt the encrypted AES key using its own private key, and may then re-encrypt the AES key using the application server's public key. In aspects, the task queue may not decrypt the task results.

At block 312, the task results are received by the application server from the task queue, and at block 313, the task results are decrypted by the application server. For example, the application server may first decrypt the AES using its own private key, and may then decrypt the task results using the decrypted AES key. It is noted that, in embodiments, the task results are not decrypted during transit from the worker to the application server.

At block 314, the task is considered complete, and at block 315, a determination is made as to whether additional tasks of the automated IS workflow are to be executed. In embodiments, an additional task may be executed when the automated IS workflow's sequence of tasks calls for additional tasks to be executed. In additional or alternate embodiments, an additional task may be determined to be executed based on the results of the currently completed task. If more tasks are to be executed, a next task may be selected and execution continues at block 301 as per the description above. Otherwise if no additional tasks are to be executed in the automated IS workflow, execution of the automated IS workflow stops and is considered complete.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-3 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a cloud storage facility, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A system comprising:
a task queue module having a first processor;
an application server hosted in a first cloud, the application server having a second processor configured to:
receive a trigger to execute an information security (IS) workflow, the IS workflow including at least one task to be executed in a device hosted in a second cloud;
encrypt a task request using a symmetric encryption key, wherein the task request is to process the at least one task within the information security (IS) workflow,
encrypt the symmetric encryption key using a first asymmetric encryption key associated with the task queue module; and
send the encrypted task request and the encrypted symmetric encryption key to the task queue module;
the task queue module configured to:
place the encrypted task request in at least one request queue of a plurality of task request queues of the task queue module;
decrypt the encrypted symmetric encryption key using a second asymmetric encryption key associated with the task queue module;
re-encrypt the symmetric encryption key using a first asymmetric encryption key associated with an at least one worker; and
send the encrypted task request and the re-encrypted symmetric encryption key to the at least one worker; and
the at least one worker hosted in the device hosted in the second cloud, the at least one worker, each having a third processor, configured to:
monitor each task request queue of the plurality of task request queues for the encrypted task request;
in response to a determination, by the at least one worker, that the at least one worker possesses sufficient resources to perform the at least one task corresponding to the encrypted task request, retrieve the encrypted task request from the at least one request queue of the task queue module; and
process the task request, wherein the at least one worker configured to process the task request comprises the at least one worker configured to:
decrypt the re-encrypted symmetric encryption key using a second asymmetric encryption key associated with the at least one worker;
decrypt the encrypted task request using the decrypted encrypted symmetric encryption key;
process the decrypted task request by selecting at least one plugin from among a plurality of plugins based on a match between the at least one plugin and a task corresponding to the decrypted task request, wherein the plurality of plugins, each having a fourth processor, are hosted in the second cloud;
invoke the at least one plugin to execute the at least one task, wherein the at least one plugin is configured to interact with a security application by communicating with an application programming interface (API) of the security application, wherein execution of the at least one task yields task results, the at least one worker further configured to receive the task results and push the task results into a result queue of the task queue module, the security application being an external security application or a security application to which the device hosted in the second cloud has access, and the task queue module further configured to send the task results from the result queue to the application server.

2. The system of claim 1, wherein the application server is further configured to:
receive at least one user input specifying a configuration of the IS workflow, the configuration defining tasks to be executed to complete execution of the IS workflow, the tasks including the at least one task; and
configure, by a machine learning module, the IS workflow defining the tasks to be executed to complete execution of the IS workflow, the tasks including the at least one task, the tasks determined by the machine learning module based on correlation of historical IS workflow-related data.

3. The system of claim 1, wherein the at least one worker is further configured to:
monitor the at least one request queue to identify tasks placed in the at least one request queue that the at least one worker is able to process.

4. The system of claim 3, wherein the at least one worker identifies tasks placed in the at least one request queue that the at least one worker is able to process based on one of:
resources available at the at least one worker; and
a type of task of the tasks placed in the at least one request queue.

5. The system of claim 3, wherein the at least one request queue includes a plurality of requests queues, and wherein the at least one worker is configured to monitor multiple requests queues of the plurality of requests queues.

6. The system of claim 3, wherein the at least one worker includes a plurality of workers, and wherein the at least one request queue is monitored by multiple workers of the plurality of workers.

7. The system of claim 1, wherein the at least one worker includes a plurality of workers, each worker of the plurality of workers running in a different device.

8. The system of claim 1, wherein the configuration of the at least one worker to invoke the at least one plugin includes configuration of the at least one worker to:
determine whether the at least one plugin is running;
in response to a determination that the at least one plugin is not running:
download the at least one plugin to a resource associated with the second device hosted in the second cloud;
cause the at least one plugin to be executed; and
provide the task request to the at least one plugin; or
in response to the determination that the at least one plugin is running, provide the task request to the at least one plugin.

9. The system of claim 8, wherein the at least one plugin is cached for a subsequent task, such that the at least one plugin is running when the subsequent task is processed by the at least one worker.

10. The system of claim 1, wherein the symmetric encryption key is an advance encryption standard (AES) key, the first asymmetric encryption key associated with the task queue module is a public key of the task queue module, the second asymmetric encryption key associated with the task queue module is a private key of the task queue module, the first asymmetric encryption key associated with the at least one worker is a public key of the at least one worker, and the second asymmetric encryption key associated with the at least one worker is a private key of the at least one worker.

11. A method comprising:
receiving, by an application server hosted in a first cloud, a trigger to execute an information security (IS) workflow, the IS workflow including at least one task to be executed in a device hosted in a second cloud, wherein the application server is a component of a system, and wherein the application server has a first processor to perform steps of:
encrypting a task request using a symmetric encryption key, wherein the task request is to process the at least one task within the information security (IS) workflow;
encrypting the symmetric encryption key using a first asymmetric encryption key associated with a task queue module of the system; and
sending the encrypted task request and the encrypted symmetric encryption key to the task queue module, the task queue module having a second processor;
the task queue module to perform steps of:
placing the encrypted task request in at least one request queue of a plurality of task request queues of the task queue module;
decrypting the encrypted symmetric encryption key using a second asymmetric encryption key associated with the task queue module;
re-encrypting the symmetric encryption key using a first asymmetric encryption key associated with an at least one worker; and
sending the encrypted task request and the re-encrypted symmetric encryption key to the at least one worker, each having a third processor;
the at least one worker to perform steps of:
monitoring each task request queue of the plurality of task request queues for the encrypted task request; and
in response to a determination, by the at least one worker, that the at least one worker possesses sufficient resources to perform the at least one task corresponding to the encrypted task request, retrieving, by the at least one worker hosted in the device hosted in the second cloud, the encrypted task request from the at least one request queue of a plurality of task request queues of the task queue module, wherein the at least one worker is an additional component of the system;
processing the task request, wherein processing the task request comprises:
decrypting the re-encrypted symmetric encryption key using a second asymmetric encryption key associated with the at least one worker;
decrypting the encrypted task request using the decrypted encrypted symmetric encryption key;
processing the decrypted task request by selecting, by the at least one worker, at least one plugin from among a plurality of plugins based on a match between the at least one plugin and a task corresponding to the decrypted task request, wherein the plurality of plugins, each having a fourth processor, are hosted in the second cloud;
invoking, by the at least one worker, the at least one plugin to execute the at least one task;
interacting, by the at least one plugin, with a security application, via an application programming interface (API) of the security application, to execute the at least one task, the security application being an external security application or a security application that the device hosted in the second cloud has access to, wherein executing the at least one task yields task results;
receiving, by the at least one worker, the task results;
pushing the task results into a result queue of the task queue module; and
sending, by the task queue module, the task results from the result queue to the application server.

12. The method of claim 11, wherein the invoking the at least one plugin to execute the at least one task includes:
  determining whether the at least one plugin is running;
  when the at least one plugin is determined not to be running:
    downloading the at least one plugin to a resource associated with the second device hosted in the second cloud;
    causing the at least one plugin to be executed;
    providing the task request to the at least one plugin; and
  when the at least one plugin is determined to be running, providing the task request to the at least one plugin.

13. The method of claim 11, wherein the symmetric encryption key is an advance encryption standard (AES) key, the first asymmetric encryption key associated with the task queue module is a public key of the task queue module, the second asymmetric encryption key associated with the task queue module is a private key of the task queue module, the first asymmetric encryption key associated with the at least one worker is a public key of the at least one worker, and the second asymmetric encryption key associated with the at least one worker is a private key of the at least one worker.

14. A computer-based tool including non-transitory computer readable media having stored thereon computer code which, when executed by a processor, causes a computing device to perform operations comprising:
  receiving, by an application server hosted in a first cloud, a trigger to execute an information security (IS) workflow, the IS workflow including at least one task to be executed in a device hosted in a second cloud, wherein the application server is a component of a system, and wherein the application server has a first processor to perform steps of:
    encrypting a task request using a symmetric encryption key, wherein the task request is to process the at least one task within the information security (IS) workflow;
    encrypting the symmetric encryption key using a first asymmetric encryption key associated with a task queue module of the system; and
    sending the encrypted task request and the encrypted symmetric encryption key to the task queue module, the task queue module having a second processor;
  the task queue module to perform steps of:
    placing the encrypted task request in at least one request queue of a plurality of task request queues of the task queue module;
    decrypting the encrypted symmetric encryption key using a second asymmetric encryption key associated with the task queue module;
    re-encrypting the symmetric encryption key using a first asymmetric encryption key associated with an at least one worker; and
    sending the encrypted task request and the re-encrypted symmetric encryption key to the at least one worker, each having a third processor;
  the at least one worker to perform steps of:
    monitoring each task request queue of the plurality of task request queues for the encrypted task request; and
    in response to a determination, by the at least one worker, that the at least one worker possesses sufficient resources to perform the at least one task corresponding to the encrypted task request, retrieving, by the at least one worker hosted in the device hosted in the second cloud, the encrypted task request from the at least one request queue of the task queue module, wherein the at least one worker is an additional component of the system;
  processing the task request, wherein processing the task request includes:
    decrypting the re-encrypted symmetric encryption key using a second asymmetric encryption key associated with the at least one worker;
    decrypting the encrypted task request using the decrypted encrypted symmetric encryption key;
    processing the decrypted task request by selecting, by the at least one worker, at least one plugin from among a plurality of plugins based on a match between the at least one plugin and a task corresponding to the decrypted task request, wherein the plurality of plugins, each having a fourth processor, are hosted in the second cloud;
    invoking, by the at least one worker, the at least one plugin to execute the at least one task;
    interacting, by the at least one plugin, with a security application of the device hosted in the second cloud, via an application programming interface (API) of the security application, to execute the at least one task, wherein executing the at least one task yields task results;
  receiving, by the at least one worker, the task results;
  pushing the task results into a result queue of the task queue module; and
  sending, by the task queue module, the task results from the result queue to the application server.

* * * * *